(No Model.)
V. H. SMITH.
PLOTTER.
No. 448,685.  Patented Mar. 24, 1891.
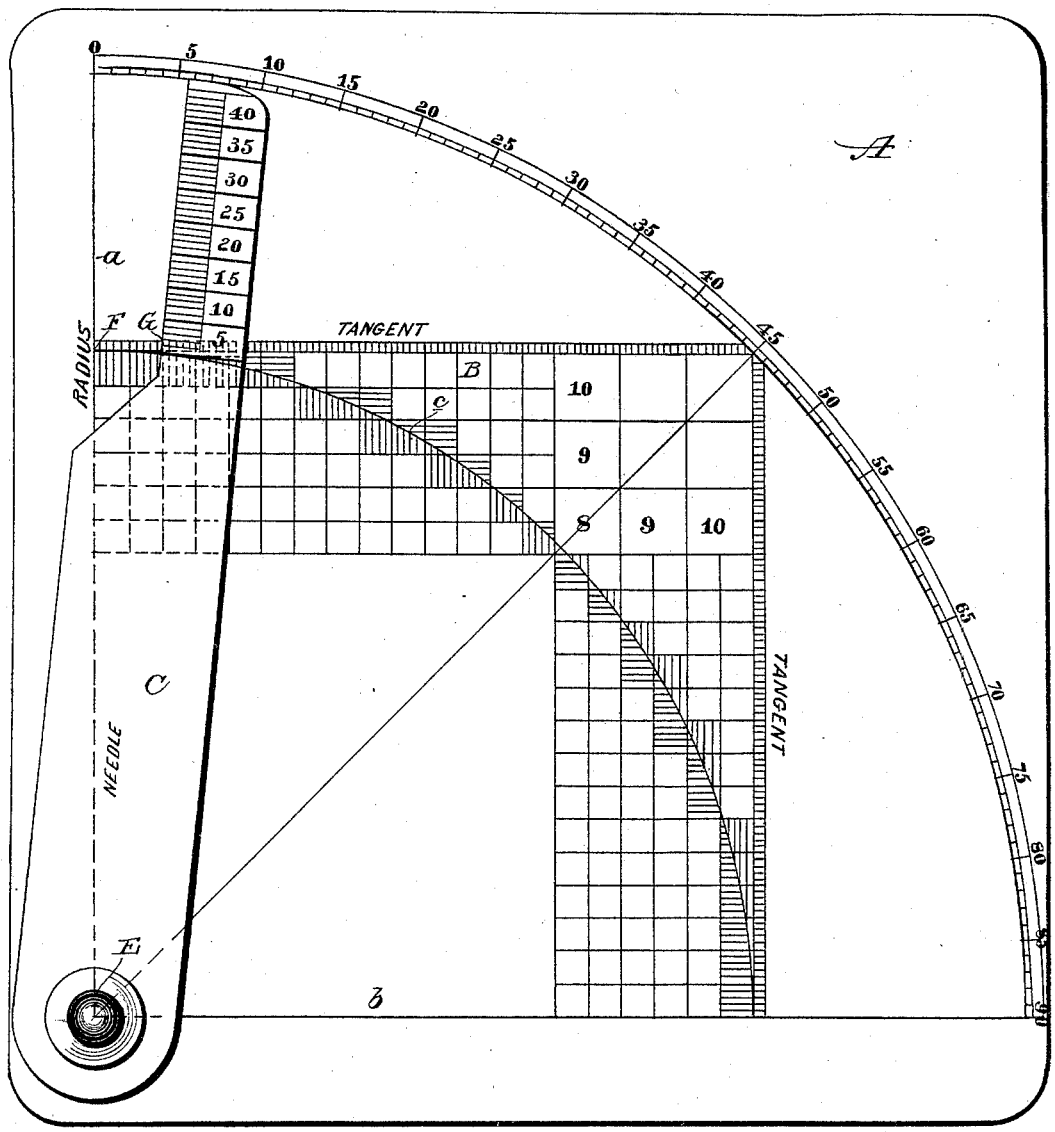

UNITED STATES PATENT OFFICE.

VALENTINE HARTGROVES SMITH, OF SHERLY, TEXAS.

PLOTTER.

SPECIFICATION forming part of Letters Patent No. 448,685, dated March 24, 1891.

Application filed September 11, 1890. Serial No. 364,611. (No model.)

*To all whom it may concern:*

Be it known that I, VALENTINE HARTGROVES SMITH, a citizen of Sherly, in the county of Hopkins and State of Texas, have invented certain new and useful Improvements in Surveying-Instruments; and I do hereby declare the following to be a full, clear, and exact description of the invention, such as will enable others skilled in the art to which it appertains to make and use the same.

My invention relates to an improvement in surveying-instruments, and has for its object to produce a simple device whereby certain information can be obtained without the necessity of auxiliary calculations.

A further object is to produce a simple instrument whereby bearings may be found showing latitude and departure of courses, lengths of angular lines, and square surface contained in a triangle.

With these objects in view the invention consists in certain novel features of construction and combinations and arrangements of parts, as hereinafter set forth, and pointed out in the claims.

The accompanying drawing represents a plan view of my improved apparatus.

A represents a plate, of any suitable material, on which the quadrant of a circle is marked, having the degrees from 0 to 90 marked thereon. Within the segment is located a square or right angle B, the end of said square extending to the radii $a$ $b$, and the apex of said square or triangle B touching the mark indicating forty-five degrees on the periphery of the quadrant. A second arc $c$ is drawn within the first or outer arc, this arc passing through the square, as represented on the drawing. At the point where the radii meet a needle C is pivoted, and is adapted to mark the radius of the inner as well as the outer arc of the quadrant, the portion of the needle between the two arcs being graduated, as explained farther on. The radius of the inner arc is intended to represent a unit of any measure, and when the radius is extended in length all the other lines are extended or supposed to be extended in like manner. The two tangents produced by the square or right angle B are each divided into one hundred equal parts. Whenever the radius is extended, it changes the value of these equal parts. If the radius is multiplied by one thousand, the unit of measure being yards or any other unit, the tangent-lines will also be multiplied, and then each division on the tangent-lines will represent ten yards or whatever measure may be used. The inner arc is graduated the same as the tangent-lines and is intended to represent, as the needle is turned from one degree to another around the arc, the length of the sine and cosine of the degree which corresponds to latitude and departure of courses. The distance on the end of the needle that is graduated is equal to the distance the needle exceeds the radius of the inner arc. Suppose, now, that E F equals one thousand units. The distance from F to G equals one hundred units. E and G are two stations between which the line is to be run. Now consider the line marked "radius" increased one thousand times and equal to E F. The tangent-line is extended in like manner. The station G is on tangent-line, which line represents one thousand units divided into one hundred equal parts, the value of each of these parts equaling ten units, and then ten of the divisions on tangent-line would equal the distance between F and G, one hundred units. The compass is placed at E and set to run an east and west or north and south line, and the compass cited will be on the line represented by E F. Place the needle of the instrument on the line marked "radius" at the extremity of the arc and turn said needle until it passes over ten divisions of the tangent-line. Next count the degrees the needle has passed on the arc, note this number, change the compass the same number of degrees, turn the compass cited to the right until the compass-needle passes over this number of degrees, and then the compass-sights will be on station G. This will give the correct bearing to G without calculations, and in the same manner other bearings may be found. The graduations on the forward end of the needle are the same as the divisions on the tangent-lines, and when the needle is at forty-five degrees it divides each arc in the center and is the length of a line drawn from corner to corner of the square. By turning the needle around the arc either way and observing the divisions on the needle between the inner arc and tangent-line, as it passes over the divisions on the tangent-lines, it shows the distance from the center to the tangent-line. This distance is always equal to the radius plus the value of as many equal parts as there are on the needle between the first arc and tangent line. The smaller square at the apex of the right angle represents a square of forty-five degrees, the lines extending each way from the center of the inner arc to the sides of the square and may be marked sine and cosine of forty-five degrees. In length they represent a distance a little greater than seven-tenths compared with the radius of a circle. This square is left blank, and we begin at seven-tenths and count eight, nine, ten, as shown in the drawing.

This device may be laid off on face of compass, if desired, and the needle of the compass be made to serve in place of the needle in the drawing.

It is evident that the size of the instrument may be varied, that the degrees may be subdivided, and that the tangent-lines may be divided into as small divisions as desired.

Having fully described my invention, what I claim as new, and desire to secure by Letters Patent, is—

1. In a surveying-instrument, the combination, with a quadrant, of a square located therein and a needle pivoted at the meeting-point of the radii of said quadrant, said square and needle being graduated, substantially as set forth.

2. In a surveying-instrument, the combination, with a quadrant having two arcs and a square within said quadrant, of a needle pivoted at the meeting-point of the radii of the quadrant, said arcs, square, and needle having graduations thereon, substantially as set forth.

3. In a surveying-instrument, the combination, with a quadrant having two graduated arcs, of a graduated square in said quadrant and a needle pivoted at the meeting-point of the radii of the quadrant, that portion of the needle between the arcs being provided with graduations representing a certain number of equal parts, substantially as set forth.

4. In a surveying-instrument, the combination, with a quadrant having an inner and an outer arc, of a square located in said quadrant, the tangents formed by said square being divided into a number of equal parts representing units (hundredths) and the radii of the inner arc being divided into a number of divisions corresponding with the divisions on the tangent-lines, and a needle pivoted at the meeting-point of the radii of the quadrant and provided with graduations between the two arcs, substantially as set forth.

In testimony whereof I have signed this specification in the presence of two subscribing witnesses.

VALENTINE HARTGROVES SMITH.

Witnesses:
J. M. MELSEN,
E. R. CRABTREE.